UNITED STATES PATENT OFFICE.

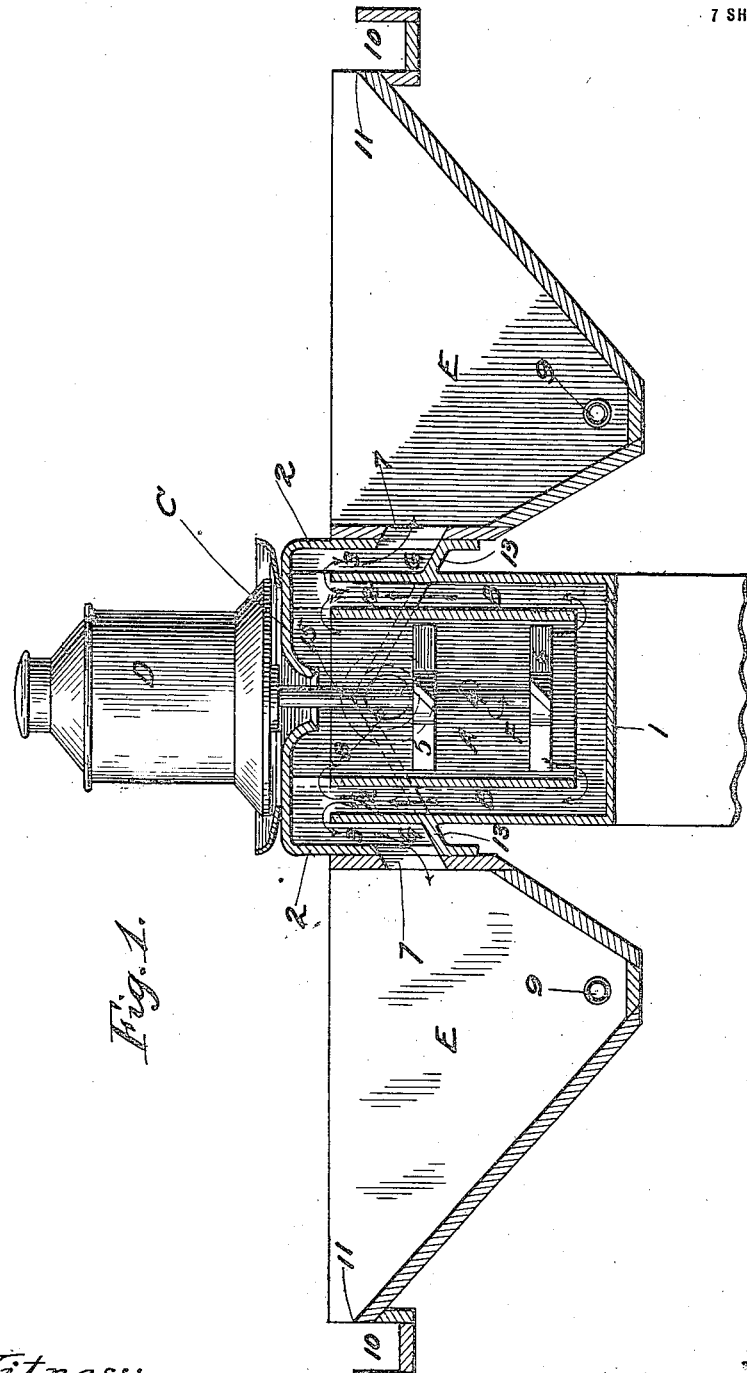

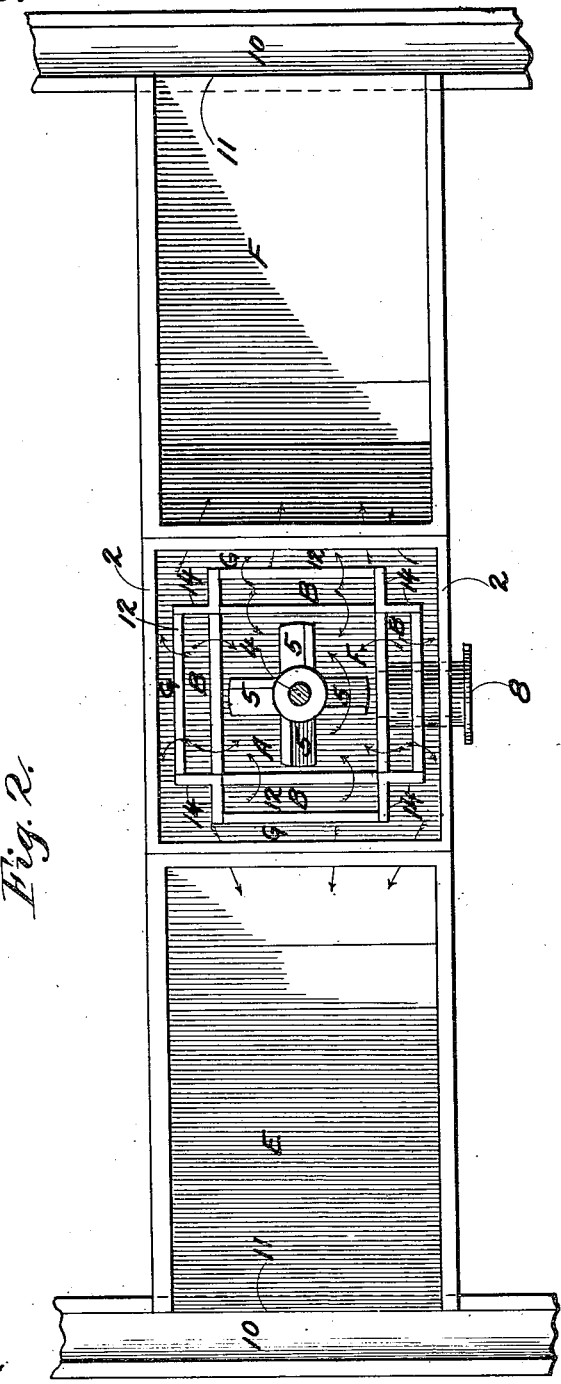

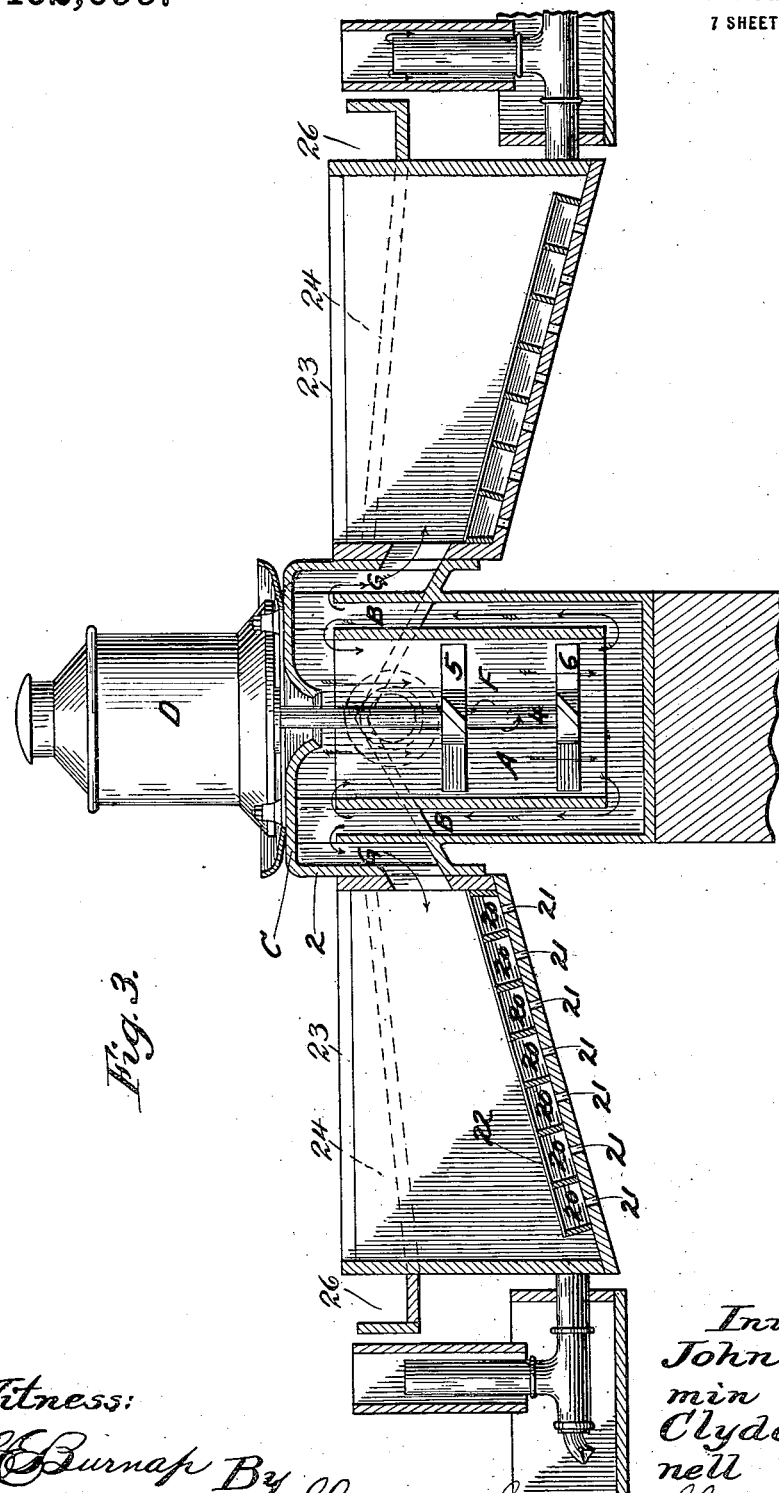

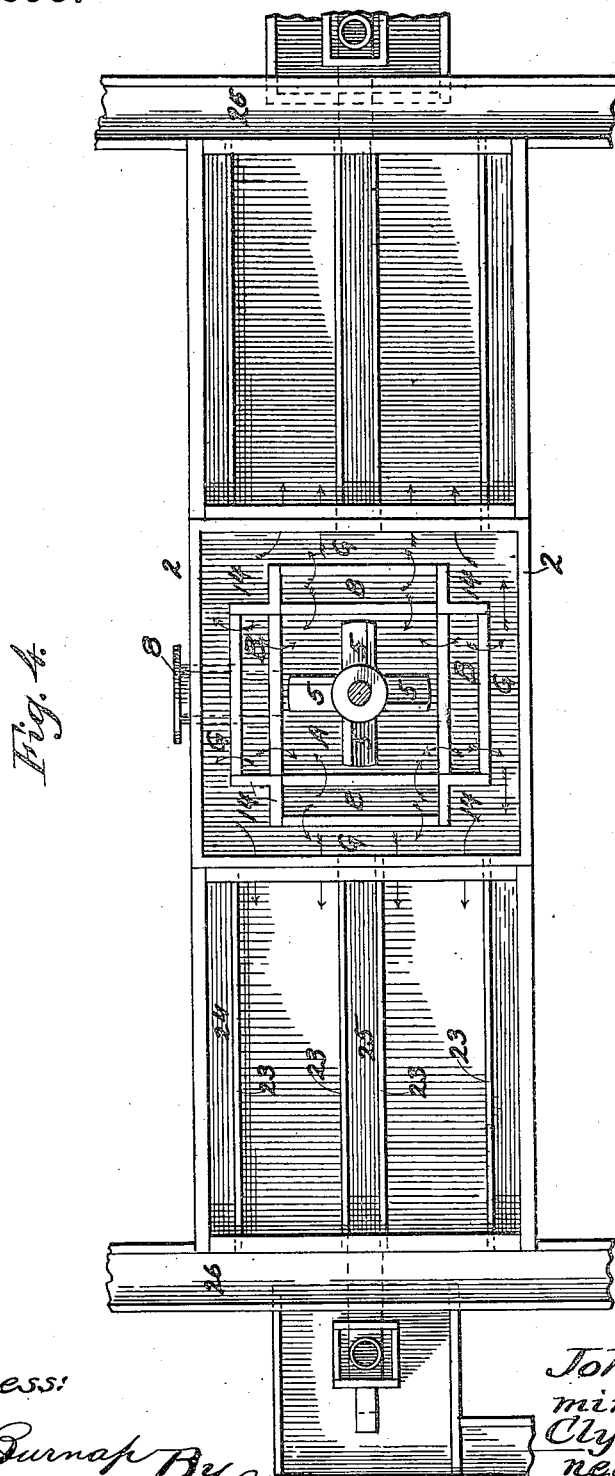

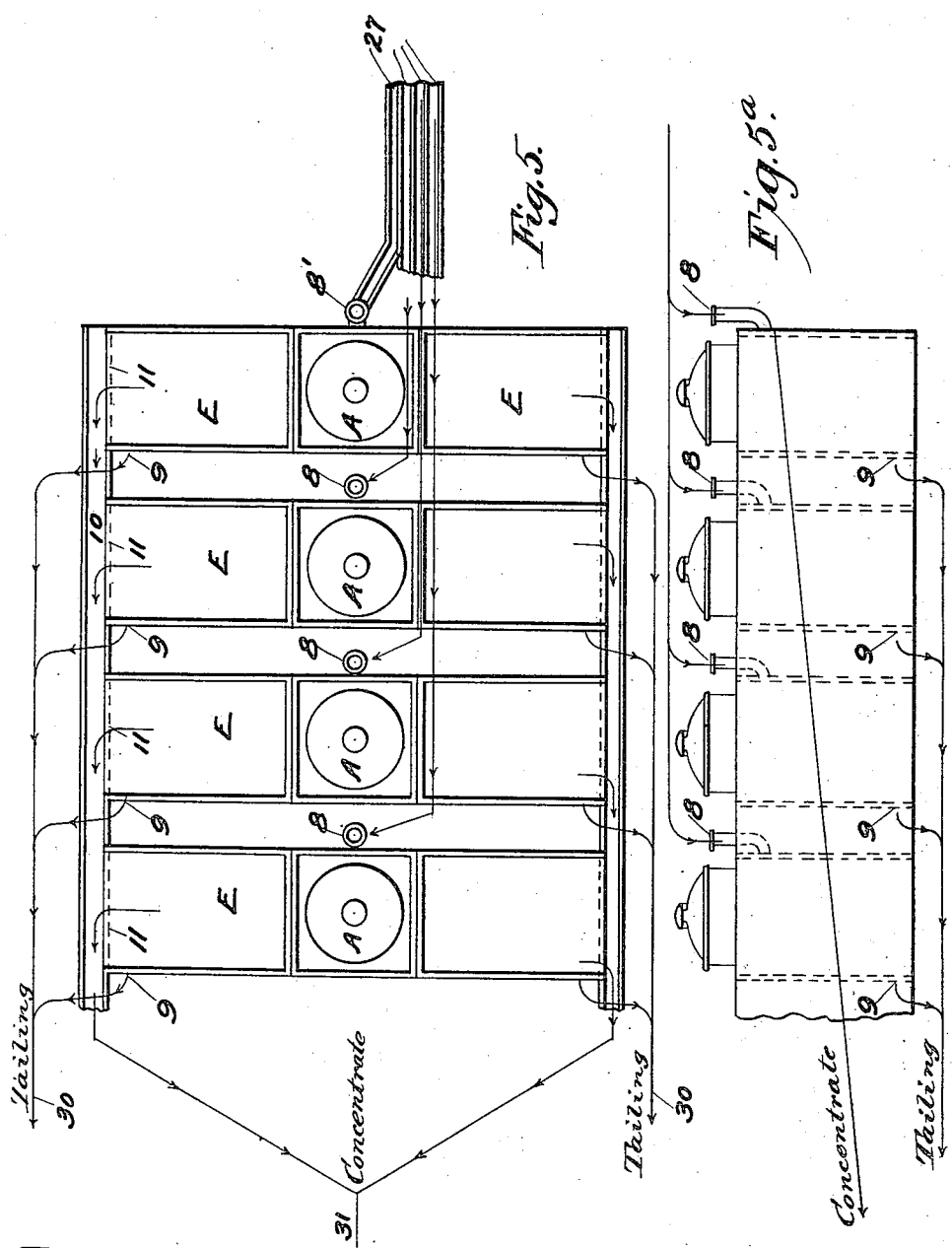

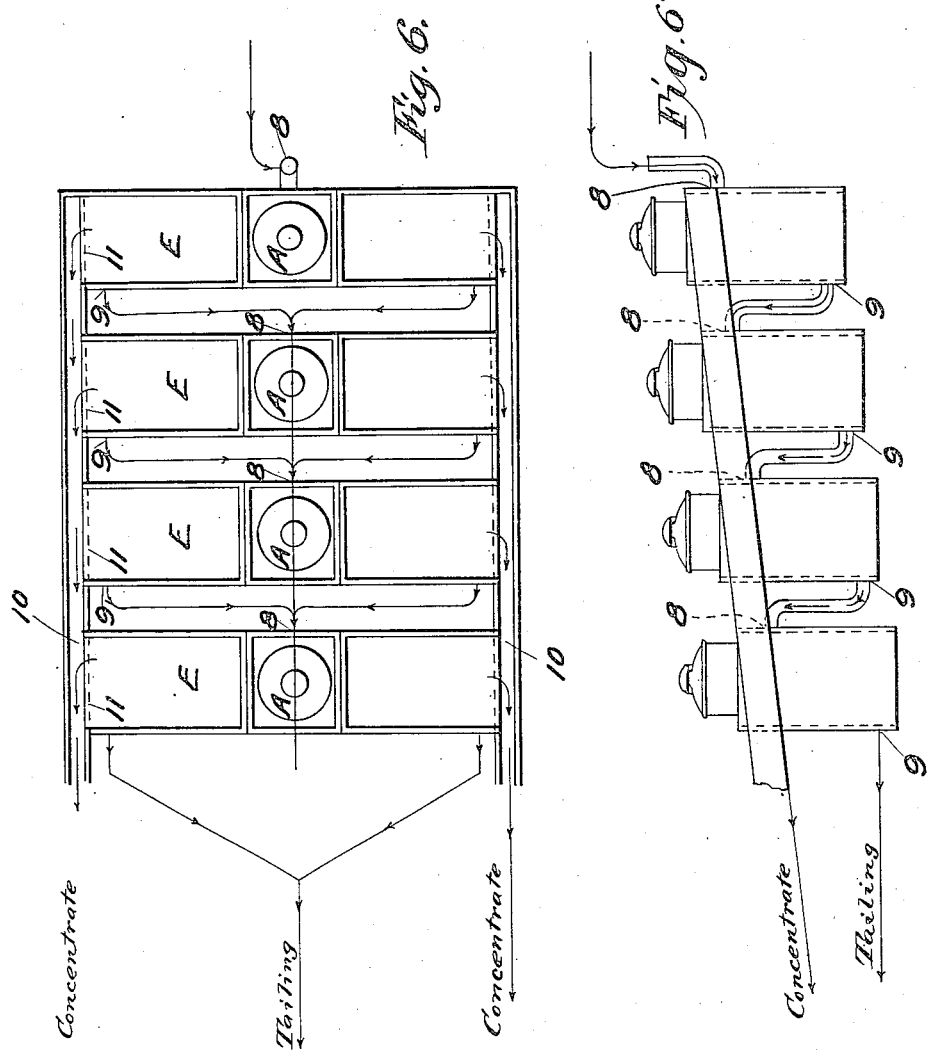

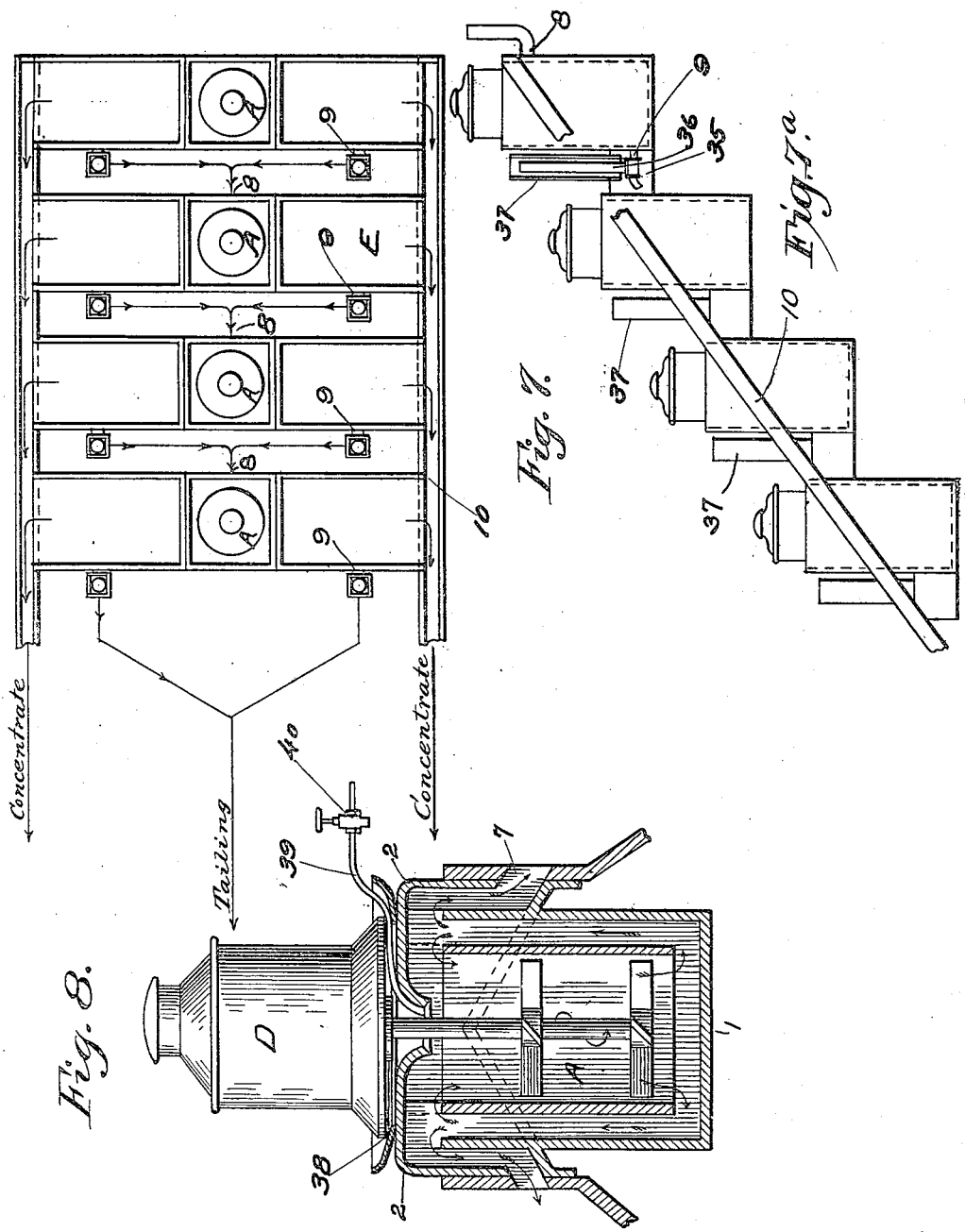

JOHN T. SHIMMIN AND CLYDE E. BUSHNELL, OF BUTTE, MONTANA.

FLOTATION APPARATUS.

1,402,099.　　　　　Specification of Letters Patent.　　Patented Jan. 3, 1922.

Application filed January 25, 1917. Serial No. 144,492.

*To all whom it may concern:*

Be it known that we, JOHN T. SHIMMIN, a citizen of the United States, residing at Butte, in the county of Silver Bow and State of Montana, and CLYDE E. BUSHNELL, a citizen of the United States, residing at Butte, in the county of Silver Bow and State of Montana, have invented certain new and useful Improvements in Flotation Apparatus, of which the following is a specification.

The object of our invention is to provide improved apparatus for the carrying out of the flotation process of concentrating ores. The particular objects and nature of the invention will be clearly apparent from the following description and claims taken in connection with the accompanying drawings, is which:

Figure 1 is a vertical sectional view through one form of our improved apparatus;

Fig. 2 is a plan view of the apparatus shown in Fig. 1;

Fig. 3 is a vertical sectional view through an apparatus similar to that shown in Fig. 1 but introducing some modifications;

Fig. 4 is a plan view of the apparatus shown in Fig. 3;

Fig. 5 is a diagrammatic view in plan showing the flow of material through the apparatus in one mode of operation;

Fig. 5ª is a side elevation of the structure illustrated in Fig. 5;

Fig. 6 is a diagrammatic view in plan showing the flow of pulp through the apparatus operated in a different way;

Fig. 6ª shows a side elevation of the arrangement of apparatus illustrated in Fig. 6;

Fig. 7 is a diagrammatic view in plan showing the flow of pulp through the apparatus in a manner somewhat similar to that shown in Fig. 6, but with the units arranged in a different manner; and Fig. 7ª shows a side elevation of the arrangement of apparatus illustrated in Fig. 7;

Fig. 8 is a detail vertical sectional view through the central part of our agitation vessel, showing another method of introducing the air or gas.

The apparatus as illustrated in Figs. 1 and 2 comprises a central agitation vessel A open at top and bottom and in the present instance shown as square in horizontal section. On each of the four sides of the agitation vessel there is a return duct, these ducts being designated generally by the letter B upon the drawings. The return ducts B communicate with the agitation vessel at their upper and lower ends and together with the bottom 1 serves to practically inclose the agitation vessel A on the four sides and bottom with an intervening space for the flow of pulp. Extending over the top of the agitation vessel A are the ducts B, and a short distance beyond the ducts B is a cover C, this covering being supported a suitable distance above the upper edges of the walls of the agitation vessel and ducts and having downwardly projecting side flanges 2 which inclose the upper part of the outer walls of the ducts B leaving intervening spaces 3.

Mounted above the cover C we have shown an electric motor D for the purpose of rotating the agitator and impeller within the vessel A. This agitator and impeller comprises a vertical shaft 4 upon which are two sets of radiating arms 5 and 6. Radiating arms 5 and 6 are secured to the shaft 4, the arms 5 being at a point considerably above the arms 6. The arms or blades 5 and 6, preferably four in each set, extend radially and are inclined to the horizontal at a suitable angle preferably 45° as shown in Fig. 1.

Adjoining the apparatus as so far described, we place a suitable number of separating boxes E, two being shown in the present instance. These separating boxes preferably take the form of the ordinary spitzkasten and communicate with the ducts B and agitating vessel A through openings 7 which extend through the downwardly projecting flanges 2 of the hood or cover C and through the adjoining walls of the separating boxes. Pulp is initially admitted to the apparatus through inlet pipes 8 which extend from the exterior of the apparatus to an opening in the wall of the agitation vessel A, the pulp being initially introduced directly into the agitating vessel in the present instance. The separating boxes E are provided with tailing discharge outlets 9 and with launders 10 to receive the floating concentrate discharged over the overflow lips 11.

In operation we prefer to rotate the agitator shaft 4 in the direction indicated by the arrows F in Figs. 1 and 2, rotation in which direction in connection with the inclination of the blades 5 and 6, has the effect of forcing the pulp introduced through the inlet 8 downwardly through the agitation vessel A while at the same time imparting to it the requisite agitation. The frothing agent, whether oil or coal tar products or other suitable substance, may be introduced into the pulp either before or after the pulp enters the apparatus, as may also such other re-agents as it is found necessary or desirable to use. Upon impelling the pulp downwardly through the agitation vessel A as above described it is forced upwardly through the ducts B, and, rising through the ducts B the agitated pulp is discharged at the open ends thereof. The pulp discharged from the open upper ends of the ducts B in part returns to the agitation vessel A over the upper edge thereof and in part falls outwardly over the outer walls 12 of the ducts B into a surrounding launder G which is formed by the depending flange or wall 2 of the cover C and a bottom wall 13 which connects the flange 2 with the outer walls 12 and side walls 14 of said ducts. The pulp overflowing into the launder G flows to the separating boxes E by reason of the inclination of the bottom 13 of said launder, which inclination is clearly shown in Fig. 1, the bottom wall sloping from a central ridge 15 to the openings 7—7 leading to the separating boxes. The agitated pulp after finding its way to the separating boxes E—E is in a state of substantial quiescense and in these boxes the concentrate froth rises and floats on the surface of the pulp until it has accumulated sufficiently to flow over the lips 11 into the concentrate launders 10—10 through which the concentrate is conducted to the point desired. The tailings are discharged through the openings 9—9 either to waste or to another apparatus for further treatment.

By means of the operation above described the pulp is circulated repeatedly through the agitation vessel and given successive agitations before being discharged into the separating boxes. The extent to which the pulp is circulated through the apparatus before being discharged to the separating boxes is dependent upon the relative capacities of the passages through which the pulp, discharged from the upper ends of the ducts B—B, finds its way to the separating boxes and back to the agitating vessel respectively and through fixing the proper relation of these passages the desired amount of circulation and agitation prior to frothing may be obtained.

The apparatus illustrated in Figs. 3 and 4 is similar in construction and operation to that above described and illustrated in Figs. 1 and 2 except in the construction of the separating boxes. The separating boxes in the construction shown in Figs. 3 and 4 instead of being spitzkasten of the ordinary type are air flotation cells. In the bottom of each cell are a series of air compartments 20 to each of which air may be separately admitted from a suitable source of air under pressure through the inlets 21. The upper sides of the compartments 20 consist of a porous medium 22 which may conveniently be constructed of one or more layers of canvas or other suitable material through which the air may escape in small bubbles into the pulp contained in the separating box. The bottom of the separating box and the upper porous wall of the air compartments are arranged upon an incline. This results in a greater head of pulp at the deeper end of the separating box but the admission of air separately to each of the compartments 20 insures an even distribution of rising air bubbles throughout the entire cross section of pulp in the separating box. By suitably fixing the amount of circulation and of agitation given to the pulp and adjusting the amount of air supplied to the pulp in the separating box the requisite treatment may be given to varying ores. As is well known, the froth resulting from mechanical agitation such as that imparted in the agitation vessel forming part of this apparatus is of a persistent, stable and comparatively permanent nature, while the froth resulting from the gentle injection of air bubbles through a porous wall, such as takes place in the separating box, is of a fragile and evanescent character, the bubbles breaking within a few seconds at most after they are formed. Each form of flotation is in many instances capable of independent use and a proper combination of the two forms often leads to beneficial results. Our improved apparatus affords means for the proper co-ordination of these two agencies. While it would be possible to make the passages leading from the upper ends of the ducts B' back to the agitating vessel and to the separating boxes adjustable for the purpose of regulating the amount of circulation and agitation imposed upon the pulp, we have found that the proper relation of these passages can be satisfactorily determined in most instances and the apparatus built in accordance with such determination without the necessity of introducing adjustable elements into the mechanism. In the apparatus illustrated in Figs. 3 and 4 we have provided overflow lips somewhat different from the arrangement shown in Figs. 1 and 2, in which figures the overflow lip 11 is shown at the ends of the spitzkasten. In the form of the device illustrated in Figs. 3 and 4 the overflow lips 23 are formed by the walls of launders 24 extending along each side and 25 extending longitudinally of the center of the separating box. The launders 24 and 25 communicate with collecting launders 26 running along the ends of the separating boxes.

Our improved apparatus may be used in single units or a plurality of units may be used in the treatment of the pulp. When a plurality of units are used the units may be operated either in series or in parallel. In Fig. 5, we have shown the units arranged in parallel. In this arrangement the pulp is conducted to the various units through launders or pipes 27 leading respectively to the inlet duct 8 of the agitation vessel A of each of the units. The tailings from each unit are discharged from the tailing outlet of the separating box to the tailing discharge indicated by the numeral 30 and connected lines, the direction of flow being indicated by the arrows thereon. The concentrates from each unit flow over the overflow lip 11 into the concentrate launder 10 through which they are conducted as indicated by arrows to the point of collection 31 of the concentrates. In Fig. 5, we have shown the form of apparatus indicated in detail in Figs. 1 and 2, but it will be apparent that the same parallel arrangement may be applied to the form of apparatus shown in Figs. 3 and 4. In Fig. 6, we have shown the flotation units arranged for series operation, the pulp being supplied to the first unit through its inlet opening 8 which conducts the pulp to the agitation vessel A thereof. The concentrate from each of the separating boxes E flows over the overflow lip to the concentrate launder 10 through which it is led as indicated by arrows to the point of collection of the concentrates. The tailings from each of the separating boxes E are led to the inlet opening 8 of the agitation vessel of the next succeeding unit and discharged as final tailings from the last unit, this being the unit at the left as shown in Fig. 6. With the apparatus arranged as shown in Fig. 6, the pulp will be moved from the spitzkasten of one unit to the agitation vessel of the next unit by the suction or pumping effect of the agitator in the next unit, the inlet openings 8 preferably leading to the agitation vessels above the agitating vanes as shown in Fig. 1, for instance. In Fig. 6, we have illustrated the series arrangement applied to the form of the device shown in Figs. 1 and 2, but this arrangement may also be applied to the form of apparatus shown in Figs. 3 and 4.

In Fig. 7, we have illustrated a series arrangement of the separate units somewhat similar to the arrangement shown in Fig. 6, but with the separate units arranged in pyramid fashion. In this arrangement, we have provided each separating box with an automatic overflow device 35, which consists of a pipe 36 leading upwardly from the outlet 9, this pipe being open at its upper end so that the pulp wells up and overflows around the outside of the pipe 36 within the casing 37. The pulp is then discharged from the lower end of the casing 37 to a suitable conveying means through which the pulp flows by gravity to the inlet opening 8 of the next agitation vessel. The concentrate flows over the overflow lips of the separating boxes to the launders 10, as in the arrangement of the apparatus previously described. It will be seen that with the arrangement shown in Fig. 7, the pulp flows from the separating boxes of one unit to the agitation vessel of the next succeeding unit by gravity without depending upon any pumping action of the agitators, and if an intermediate unit be cut out of operation by a by-pass extending around it, the pulp will flow by gravity around the idle unit without the use of auxiliary pumping means.

In Fig. 8, we have shown a modification of the agitation vessel and associated parts in which the opening beneath the casing of the motor D is closed by an annular ring 38, and instead of permitting the air to be drawn in by the suction of the agitator, the air, or gas, may be introduced through a pipe 39 having located therein a gate valve 40 for controlling the flow. By this means, the air, or gas may be forced in under pressure and drawn into the pulp by the suction which is created by the agitators which create a vortex in the pulp in the upper part of the agitation vessel.

While we have herein described and illustrated a specific form of apparatus embodying the features of our invention it will be apparent that the invention may be applied in apparatus of widely different form.

What we claim is:

1. The combination in apparatus for treating ore pulp, of a stationary agitation vessel, means located in said vessel for agitating said pulp to mingle air therewith and for impelling said pulp downwardly through said vessel, a duct communicating directly with said vessel at its upper and lower ends for conveying pulp from the lower part of said vessel to the upper part thereof, a separating box adjacent said vessel, and means communicating directly with the upper parts of said vessel and said duct to convey the agitated and aerated pulp therefrom into said separating box below the level of pulp therein.

2. The combination in apparatus for treating ore pulp, of a stationary agitation vessel, means located in said vessel for agitating said pulp to mingle air therewith and for impelling said pulp downwardly through said vessel, a duct communicating directly with said vessel at its upper and lower ends for conveying pulp from the lower part of said vessel to the upper part thereof, a separating box adjacent said vessel, and an overflow lip over which the agitated and aerated pulp passes to said separating box.

3. The combination in apparatus for treating ore pulp, of a stationary agitation vessel, a duct surrounding said vessel and communicating with the upper and lower parts thereof, a separating box communicating directly with the upper part of said duct, means for mechanically agitating and aerating said pulp in said vessel and to cause a flow of agitated and aerated pulp in said vessel in a direction opposite to the movement of the pulp in said duct, a cover for said vessel, and means for admitting air to the space in said vessel beneath said cover.

4. The combination in apparatus for treating ore pulp, of a stationary agitation vessel, a duct surrounding said vessel and communicating with the upper and lower parts thereof, a separating box communicating directly with the upper part of said duct, means for mechanically agitating and aerating said pulp in said vessel and to cause a flow of agitated and aerated pulp in said vessel in a direction opposite to the movement of the pulp in said duct, and means for causing a part of said pulp to return to said vessel from said duct and the other part to flow off into said separating box.

5. The combination in apparatus for treating ore pulp, of a stationary agitation vessel, a duct surrounding said vessel and communicating with the upper and lower parts thereof, a separating box communicating directly with the upper part of said duct, means for mechanically agitating said pulp in said vessel to form a mineral bearing froth and to cause a flow of pulp in said vessel in a direction opposite to the movement of the pulp in said duct, means for causing a part of said pulp to return to said vessel from said duct and the other part to flow off into said separating box, and means for introducing air in a finely divided condition into the pulp in said box.

6. In a device of the class described, an agitation vessel, means for mechanically agitating an ore pulp and impelling it in a vertical direction therethrough, a duct exterior to said vessel and communicating therewith at top and bottom, the pulp being adapted to pass upwardly through said duct, a froth separating box communicating directly with the upper parts of said vessel and duct, and means for introducing air into substantially quiescent pulp in said separating box.

7. In a device of the class described, an agitation vessel, means for admitting air from outside of said vessel to said vessel, means in addition to said air supply means for agitating an ore pulp and impelling the same in a vertical direction through said vessel, a duct adjacent said vessel and communicating therewith at its upper and lower ends through which pulp may move in a direction opposite to that in which it is impelled through said vessel, and a froth separating box adjacent said vessel and duct to receive pulp therefrom.

8. In a device of the class described, an agitation vessel, means for admitting air from outside of said vessel to said vessel, means for agitating ore pulp in said vessel and impelling the same downwardly therethrough, a duct surrounding said agitation vessel and communicating with the lower part thereof, whereby said pulp passes upwardly through said duct after being impelled downwardly through said vessel, a separating box, and an overflow lip between said separating box and said duct located on the same level as the upper edge of said vessel, whereby a part of the pulp flows from said duct into said separating box and a part thereof returns to said vessel.

9. In a device of the class described, a stationary agitation vessel, a separating box adjacent said vessel, means in said vessel for agitating and aerating an ore pulp and for impelling the same downwardly therethrough, a duct adjacent said vessel through which said agitated and aerated pulp may rise from the lower part of said vessel, means for causing a part of the agitated and aerated pulp discharged by said duct to return to said vessel and the other part to flow into said separating box, and means separate from said duct for introducing the pulp into said vessel adjacent the upper part of said agitating means.

10. The combination in apparatus for treating ore pulp, of an agitation vessel having an overflow lip around the upper part thereof, a circulating duct surrounding said agitation vessel and having an overflow lip around the upper part thereof, means in said agitation vessel for agitating said ore pulp and circulating the same in opposite directions through said agitation vessel and said duct, a launder around the upper part of said circulating duct adapted to receive the pulp and froth discharged over the overflow lip thereof, separating boxes on opposite sides of said agitation vessel and communicating directly with said launder, and overflow lips along the lateral edges of said separating boxes.

11. The combination in apparatus for treating ore pulp, of an agitation vessel having an overflow lip around its upper edge, a duct communicating with the lower part of said agitation vessel and having an overflow lip adjacent to the overflow of said vessel, means in said vessel for mechanically agitating said ore pulp to mingle air therewith and to impel the agitated and aerated pulp through said vessel in a direction opposite to its movement in said duct, a separating box adjacent said agitation vessel, and means for conveying agitated and aerated pulp from the overflow lip of said duct to said separating box.

12. The combination in apparatus for treating ore pulp, of an agitation vessel having an overflow lip around its upper edge, a duct communicating with the lower part of said agitation vessel and having an overflow lip adjacent to the overflow of said vessel, means in said vessel for mechanically agitating said ore pulp to mingle air therewith and to impel the agitated and aerated pulp through said vessel in a direction opposite to its movement in said duct, a separating box adjacent said agitation vessel, and means for conveying agitated and aerated pulp from the overflow lip of said duct to said separating box beneath the level of pulp therein, the overflow lip of said agitation vessel and the overflow lip of said duct being on the same level.

In testimony whereof, we have subscribed our names.

JOHN T. SHIMMIN.

Witnesses:
  CHAS. BORNING,
  J. L. BRUCE.

CLYDE E. BUSHNELL.

Witnesses:
  M. A. PAYNE,
  O. H. SHOEMAKER.